Nov. 22, 1966 C. E. BOHNENBLUST 3,287,509

APPARATUS TO VISUALLY IDENTIFY CABLE PAIRS IN A MULTIPAIR CABLE BY CABLE PAIR ENCODING MEANS

Filed Oct. 10, 1963

2 Sheets-Sheet 1

INVENTOR
C. E. BOHNENBLUST
BY R. O. Nimtz
ATTORNEY

Nov. 22, 1966 C. E. BOHNENBLUST 3,287,509

APPARATUS TO VISUALLY IDENTIFY CABLE PAIRS IN A MULTIPAIR CABLE BY CABLE PAIR ENCODING MEANS

Filed Oct. 10, 1963 2 Sheets-Sheet 2

United States Patent Office 3,287,509

Patented Nov. 22, 1966

3,287,509

APPARATUS TO VISUALLY IDENTIFY CABLE PAIRS IN A MULTIPAIR CABLE BY CABLE PAIR ENCODING MEANS

Clarence E. Bohnenblust, Saratoga, Calif., assignor to American Telephone and Telegraph Company, New York, N.Y., a corporation of New York Filed Oct. 10, 1963, Ser. No. 315,129
7 Claims. (Cl. 179—175.3)

Figure 1:
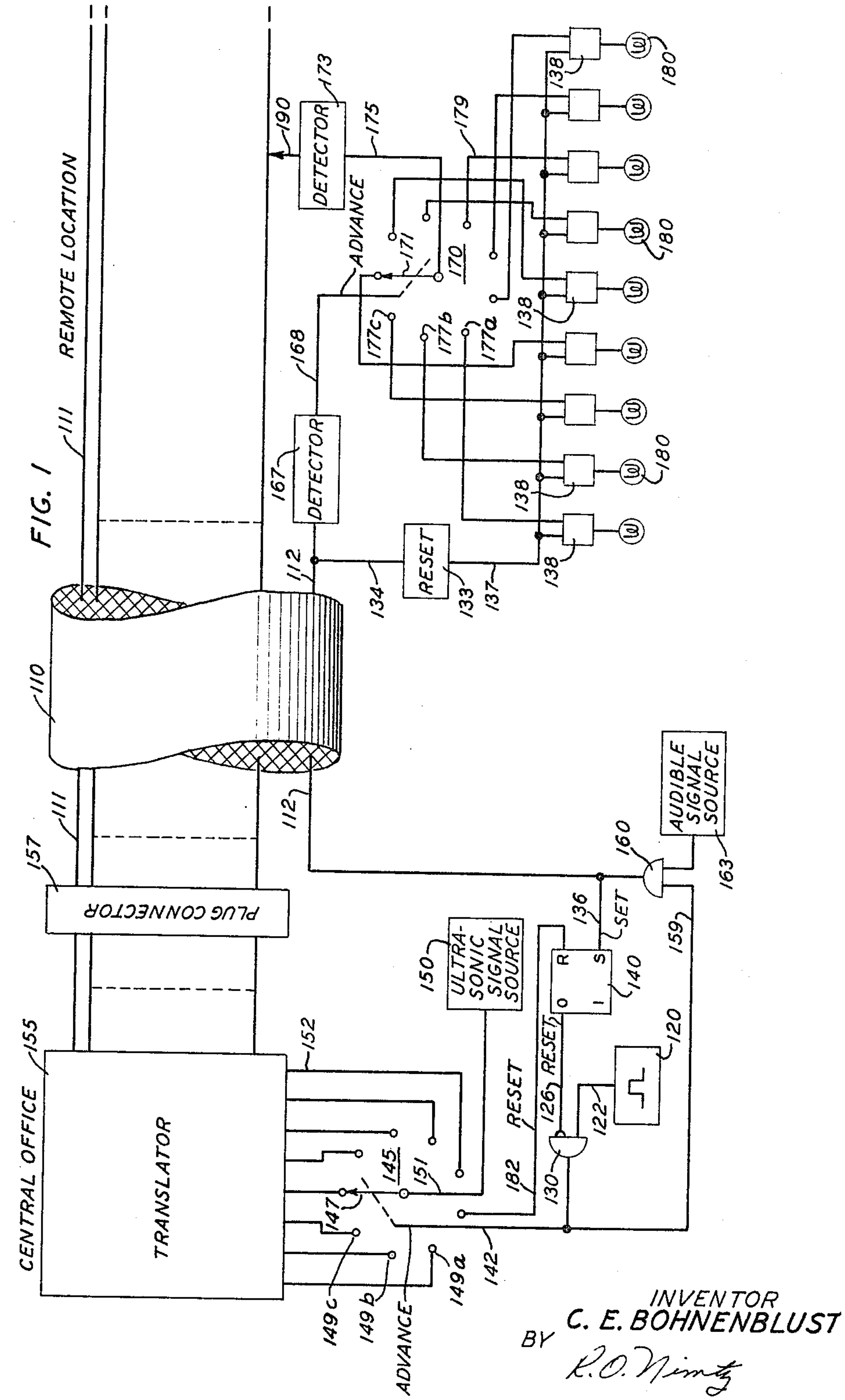

This invention relates to the identification of conductors in a multiconductor cable and, more particularly, to the automatic identification of conductor pairs in a telephone exchange cable.

A telephone cable used to connect subscribers from some remote location to a central office is generally made up of a large number of insulated pairs of conductors which are twisted together. These conductors are all contained within a single protective sheath. Each of the conductor pairs connects a particular subscriber to a terminal on a main frame at the central office. Each conductor pair at the end of a cable in the field must therefore be identified in terms of its corresponding connection to the main frame at the central office.

Identification of the conductor pairs is, at present, conducted manually. Two workmen are stationed, respectively, at the central office and the field end of the cable. The man in the central office applies an audible signal to each of the conductor pairs. He communicates the identity of each energized pair to the man in the field at the time the signal is applied. The man in the field has an electrical probe connected to an audio detector. As the man in the field is informed of the identity of an energized pair, the manually scans the conductor pairs of the cable to find the energized pair. When located, he puts an identification marker on that pair and notifies the man at the central office of the identification. This procedure is continued until all of the conductor pairs have been identified. Apparatus to perform this type of identification is disclosed in Fisher-Parker Patent 2,133,384, issued October 18, 1938.

There also presently exists an identification system that permits a single operator to identify the conductor pairs. Such a system usually comprises some dial pulse controlled electromechanical selecting means to allow the operator at the field location of the multiconductor cable to selectively apply a signal tone at the central office to any conductor pair in the cable. The operator then manually scans all of the conductor pairs at the field end of the cable until he locates the one that is energized. Such identification systems are disclosed in Lowman Patent 2,799,739, issued July 16, 1957, and Meanley Patent 2,806,995, issued September 17, 1957.

Another identification system permitting a single operator to identify conductor pairs utilizes an audible signal, applied by the operator at the field location to a conductor pair selected at random, to operate electromechanical switching means at the central office termination of the cable. This central office electromechanical switching means indicates a number corresponding to the identity of the conductor pair. Electromechanical switching means at the field location, which are controlled by the central office switching apparatus, indicate the same identifying number to the operator. Such an identification system is disclosed in the patent application of J. F. L. Palmer, Serial No. 160,785, filed December 20, 1961, and assigned to applicant's assignee.

In the above-described prior identification systems, the methods used to identify conductor pairs are either too slow and cumbersome or else require the operator to perform a large number of duties in the operation of fairly complicated equipment with a high probability of error. The present invention identifies individual conductor pairs automatically with a minimum of skill and effort required on the part of the operator.

It is an object of the present invention to reduce the time consumed and improve the efficiency of conductor pair identification.

It is another object of the invention to automatically identify any conductor pair of a cable at its field location termination.

It is yet another object to identify conductor pairs with the use of only a single operator to control the apparatus.

It is still another object of the invention to identify conductor pairs with a high degree of precision and accuracy.

It is a further object to apply unique identifying signals to all of the conductor pairs simultaneously, allowing the identification of an individual conductor pair without the necessity of advancing through a partial cycle of operation wherein all the conductor pairs are sequentially energized.

In accordance with the present invention, combinations of different stepping stages of a cyclic pulse distribution network at the central office location of a multipair cable are uniquely coupled to individual conductor pairs. The stepping stage combinations induce coded pulse trains unique to each individual conductor pair. A similar cyclic pulse distribution network at the field location of the multipair cable is synchronized with the distribution network at the central office.

An electrical probe is coupled to one of the conductor pairs selected at random at the field location of the multipair cable. The unique pulse train sensed by the probe is transmitted through the different stages of the distribution network at the field location. The stages through which the pulses are transmitted are in a one-to-one correspondence with the stages at the central office coupled to the selected conductor pair. This transmitted signal lights lamps, giving a visual identification of the conductor pairs to which the probe is coupled.

Figure 2:
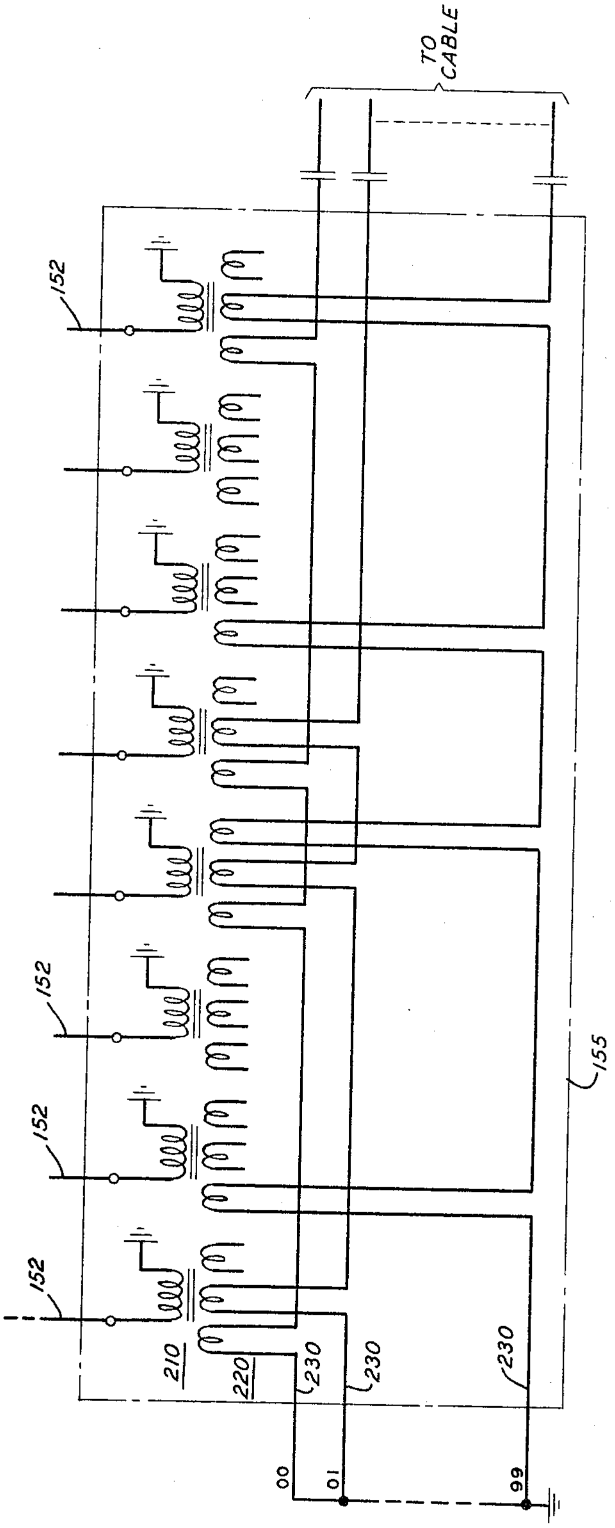

These and other objects, the nature of the present invention and its various advantages, will appear more fully upon consideration of the attached drawings and of the following detailed description of the drawings wherein:

FIG. 1 is a general block diagram of a conductor pair identifying apparatus according to the present invention; and FIG. 2 more particularly depicts the central office translator shown in block form in FIG. 1.

Referring more particularly to FIG. 1, a particular embodiment of the invention is shown in block diagram form. A multiconductor cable 110 is shown containing a plurality of conductor pairs 111 and a spare conductor pair 112. The spare conductor pair 112 is distinguished from the other conductor pairs by some easily identifiable marking and is used as a control pair to interconnect the identifying apparatus at the field and central office locations. For the purposes of illustrating the invention, it is assumed that, in addition to the spare conductor pair, the cable contains one hundred conductor pairs to be identified and that each conductor pair is to be identified with a unique binary code. It is to be understood that the principles of the invention are equally applicable by those skilled in the art to cables having different numbers of conductor pairs and to different coding schemes.

The operator at the field location couples a capacitive probe 190 to a particular conductor pair he wishes to identify. For purposes of explanation, it is assumed that the probe 190 is coupled to the conductor pair identified with the number thirty-seven, although this fact is not known to the operator. The probe 190 is preferably a capacitive probe to eliminate the necessity of breaking the insulation of the conductor pair. A capacitive probe suitable for use in the present invention is disclosed in R. M. Scarlett, Patent 3,181,062, issued April 27, 1965.

The operator initiates the operation of the apparatus by operating the reset switch 133. The reset switch 133 may be any switching device which, when activated, produces a single triggering pulse output. The reset switch 133 applies a triggering pulse, via lead 134, to the spare conductor pair 112. The spare conductor pair 112 transmits this pulse to the central office where it is applied, via lead 136, to the "set" input of the bistable multivibrator 140. The reset output of the multivibrator 140 is applied, via lead 126, to the inhibiting input of the gating network 130. Multivibrator 140 therefore de-energizes lead 126, and gating network 130 is, therefore, enabled to transmit a repetitive pulse train from the pulse generator 120.

The pulse generator 120 supplies a continuous train of keying pulses, via lead 122, to the input of the gating network 130. It is to be understood that the invention is not limited to any particular pulse generator. Many equivalent circuits will be at once apparent to those skilled in the art without departing from the spirit and scope of one invention.

Operating the reset switch 133 also simultaneously applies a voltage pulse, via lead 137, to reset a plurality of latching circuits 138. The latching circuits 138 may comprise individual bistable multivibrators. These networks were initially switched to some particular state in the process of identifying the last conductor pair. The latching circuits will be discussed subsequently with regard to their operation in the identification of conductor pairs.

The repetitive pulse output of the pulse generator 120 is transmitted, via the gating network 130 and lead 142, to a cyclic pulse distribution network 145. The pulse distribution network may, as shown in FIG. 1, comprise a rotating armature 147, stepped around a plurality of conducting pick-up segments 149. A pulse signal applied by the pulse generator 120 to lead 142 causes the rotary armature to advance in sequence from one segment 149 to the next until all the segments have been so scanned. The output of an ultrasonic signal source 150 is applied, via lead 151, to the rotary armature 147. The rotary armature, as it rotates, applies this ultrasonic signal sequentially to the segments 149. The signal transmitted on each of the segments 149 is applied, via a lead 152, to a translator 155.

The translator 155, which is subsequently described more fully with reference to FIG. 2, takes each of the sequentially stepped ultrasonic signals and applies them to selected ones of the individual conductor pairs 111. One complete rotation of the rotary armature 147 of the pulse distribution network 145 applies to each conductor pair a unique time divided pulse train.

The translator 155 is connected to the conductor pairs of the cable by a plug connector 157. This plug connector 157 is fastened to the main distributing frame where the conductor pairs terminate at the central office. The plug connector may comprise any electrical connection device suitable for insertion onto a telephone central office main distributing frame.

The pulse output of the gating network 130 is also applied, via lead 159, to an AND gate 160. This AND gate 160 enables the transmission of short bursts from an audible signal source 163 on the spare conductor pair 112 to a detector 167 at the field location. The detector 167 converts these audible signal pulses into direct-current pulses, on lead 168, to step the rotary armature 171, of the pulse distribution network 170, to each of the segments 177. The pulse distribution network 170 may be similar to the pulse distribution network 145 at the central office.

The time divided pulse trains unique to each conductor pair 111 are transmitted by these conductors to the field location. The pulse train on the conductor pair identified by the number thirty-seven is picked up by the probe 190.

The signal picked up by the probe 190 is converted to a direct-current pulse signal by a detector 173, which is essentially a signal envelope detector. The direct-current pulse output of the detector 173 is applied, via lead 175, to the rotary armature 171. As each signal is received and converted to a direct-current pulse by the detector 173, it is applied, through the rotary armature 171, to one and only one of the segments 177. Since only one segment 177 is energized at any one time, and since the pulse train detected by the probe 190 is not continuous, an output will be produced only at certain ones of the segments 177.

As indicated previously, the probe is connected to the conductor pair identified by the number thirty-seven. The coding scheme, which will be described subsequently, is such that the binary representation of the number thirty-seven is 00100011, each digit representing the signal condition at a particular time slot. As the first segment **177*a* is contacted by the rotary armature 171, no energizing pulse in the first time slot is available, via lead 175, to be transmitted to segment 177*a*. No pulse output is therefore available to switch the first latching circuit 138. The same result follows in the second time slot as the rotary armature 171 contacts the second segment 177*b*. A pulse on lead 175, however, in the third time slot, is applied by the rotary armature 171 to the third segment 177*c*. This signal is applied, via lead 179, to the corresponding latching circuit 138. The latching circuit is switched into an active state, enabling it to energize a lamp 180. The lamps ultimately energized by the pulse train detected by probe 190** identify the conductor pair to which the probe is attached as pair number 00100011, or number thirty-seven.

The output of the last stage of the pulse distribution network 145 in the central office is applied, via lead 182, to the reset input of the multivibrator 140. The switched multivibrator 140 then applies a direct-current signal, via lead 126, to the disabling input of the gating network 130. This disables the transmission of the pulse output of the pulse generator 120. The pulse output is thereby removed from leads 142 and 159, stopping the rotation of the rotary armature 147 of the pulse distribution network 145 and disabling the output of the audible signal source 163 by disabling the AND gate 160.

No further advance signals are applied over the control pair 112 to the pulse distribution network 170, via detector 167. Consequently, the rotary armature 171 ceases stepping on the final one of segments 177 in the rotation sequence. The signal output transmitted by this pick up element 177 is applied to the last lamp 180 in the series which serves to indicate that one cycle of operation is complete. To identify another conductor pair, the operator places the probe 190 on another conductor pair and operates the reset switch 133, whereupon operation of the apparatus resumes as previously described.

Referring now to FIG. 2, a schematic circuit is shown of one particular means for applying coded pulse trains to each of the conductor pairs simultaneously. The connections are shown for only three conductor pairs. However, the coding scheme shown is applicable to one hundred conductor pairs. It is to be understood that the general principles of this inductive coupling translator are applicable to any number of conductor pairs, the present scheme being used only as an illustrative embodiment.

The input leads are attached to the primary windings of transformers 210. The transformer 210 shown in the illustrative embodiment includes up to a total of forty single turn secondary windings each coupled to different ones of the conductor pairs 111.

Signals are applied sequentially to the input leads 152 by the pulse distribution network 145 as shown in FIG. 1. As each transformer is energized in sequence, an ultrasonic pulse signal is applied to the conductors 230 which are coupled to the secondary windings 220 of that transformer and are joined to the conductor pairs 111 through the plug connector 172. After the entire sequence of transformers has been energized, each conductor pair 111 of the cable will have received two to four pulse signals at different time intervals; the time sequence forming the basis of a unique pulse permutation code for each conductor pair 111. The coding scheme illustrated is but one of many other coding schemes which would be suitable to the present arrangement and may easily be implemented by those skilled in the art.

For illustrative purposes, the binary coded decimal coding scheme which is used in FIG. 2 is illustrated below. Four binary digits are required to represent the digits zero to nine. To represent a two-digit number, eight binary digits are required, and so forth. The coding scheme is shown in the table below:

| Decimal digit: | Binary representation |
|---|---|
| 0 | 1001 |
| 1 | 1000 |
| 2 | 0100 |
| 3 | 0010 |
| 4 | 0001 |
| 5 | 1100 |
| 6 | 0110 |
| 7 | 0011 |
| 8 | 1010 |
| 9 | 0101 |

While the conductor pair identification system of the present invention has been described in connection with identifying conductors in a telephone system, it is to be understood that this embodiment is simply illustrative of the many possible arangements which can represent applications of the principles of the invention. The other applications can readily be devised by those skilled in the art without departing from the spirit and scope of the invention.

What is claimed is:

1. In combination, a cable interconnecting a telephone central office and a field location, said cable containing a plurality of conductors, pulse generating means, first pulse distribution means at said central office, second pulse distribution means at said field location, means to apply the output of said pulse generating means to advance both said first and second pulse distribution means, translation means to convert the distributed output of said first pulse distribution means into unique pulse codes, one on each of said conductors in said cable, probing means at said field location to detect pulse signals on individual ones of said conductors, storage means connected to the individual distributed outputs of said second pulse distribution means enabled by pulse signals detected on said probing means, and display means connected to said storage means.

2. Apparatus according to claim 1 wherein said translation means comprises means to couple each of said conductors to selected ones of individual stages of said first pulse distribution means.

3. Apparatus according to claim 1 wherein said first pulse distribution means includes an alternating signal source for providing carrier signals for said unique pulse codes, and said second pulse distribution means at said field location includes means to convert said alternating signals transmitted by said plurality of conductors and detected by the probe means to unidirectional control signals.

4. Apparatus to identify conductor pairs of a multiconductor cable comprising, in combination, a first cyclic pulse distributing means at one end of said multiconductor cable, a second cyclic pulse distributing means at the other end of said multiconductor cable, translation means at said one end of said multiconductor cable, said first and second cyclic pulse distributing means successively energizing a plurality of output leads, said translation means coupling each one of the conductors of said multiconductor cable to selected ones of said output leads at said one end of said multiconductor cable, means to synchronize said cyclic pulse distribution means, probe means to detect a pulse train on any one of said conductors of said cable, said second pulse distribution means distributing individual pulses of said pulse train to a plurality of storage means, said storage means enabling the storage of each pulse of said pulse train under control of said second cyclic pulse distributing means, and display means to present a visual indication of the stored pulses.

5. Apparatus according to claim 4 further including an alternating current signal source at said one end of said multiconductor cable, means to gate said alternating current signals in synchronism with the advance of said first pulse distribution means, means to transmit said gated alternating current signals to said field location, means at said field location to convert said gated alternating signals to unidirectional pulses, and means to apply said unidirectional pulses to the advancing input of said second cyclic pulse distribution means.

6. Apparatus to identify individual conductors in a multiconductor cable interconnecting a central office to some remote location comprising, a first pulse distributing means at said central office, a second pulse distributing means at said remote location, an audible signal source at said central office, an ultrasonic signal source at said central office, a pulse generator at said central office, said pulse generator applying driving pulses to advance said first pulse distributing means, said first pulse distributing means sequentially connecting the output of said ultrasonic signal source to a plurality of output leads, translating means to simultaneously apply said ultrasonic signals on each of said plurality of output leads to a selected plurality of different ones of said conductors to form thereon a pulse code unique to each said conductor, gating means responsive to said pulse generator to enable the output of said audible signal source, spare conductor means to transmit said enabled audible signals to the advance input of said second pulse distributing means at said field location so as to synchronize first and second pulse distributing means, probing means to detect pulse coded electrical signals on any one of said individual conductors, said pulse coded signal detected by said probe being distributed to a plurality of storage means by said second pulse distribution means, and display means to produce a visual indication of the stored pulse outputs of said second pulse distributing means.

7. A conductor pair identification system for a cable including a plurality of conductor pairs and having a first and a second termination, said system comprising means at said first termination to generate a series of pulse signals, means to select a unique arrangement of pulse signals from said series of pulse signals indicative of the identity of each individual conductor pair, means to apply each said unique arrangement to the one of said conductor pairs it identifies, detector means coupled to a selected one of said conductor pairs at said second termination for detecting said unique arrangement of pulse signals, means for storing said unique arrangement of pulse signals thus detected, and means for displaying the contents of said storing means.

References Cited by the Examiner

UNITED STATES PATENTS 2,938,075 5/1960 Gargini ---------- 178—6

KATHLEEN H. CLAFFY, *Primary Examiner.*

S. J. BOR, F. N. CARTEN, *Assistant Examiners.*